US008694608B2

(12) United States Patent
Salusky et al.

(10) Patent No.: US 8,694,608 B2
(45) Date of Patent: Apr. 8, 2014

(54) CLIENT APPLICATION FINGERPRINTING BASED ON ANALYSIS OF CLIENT REQUESTS

(75) Inventors: William Salusky, Sterling, VA (US); Mark Ellzey Thomas, Fairfax, VA (US)

(73) Assignee: AOL Inc., Dulles, VA (US)

( * ) Notice: Subject to any disclaimer, the term of this patent is extended or adjusted under 35 U.S.C. 154(b) by 0 days.

(21) Appl. No.: 13/584,494

(22) Filed: Aug. 13, 2012

(65) Prior Publication Data

US 2012/0311027 A1 Dec. 6, 2012

Related U.S. Application Data

(62) Division of application No. 12/176,603, filed on Jul. 21, 2008, now Pat. No. 8,244,799.

(51) Int. Cl.
*G06F 15/16* (2006.01)
*G06F 15/173* (2006.01)

(52) U.S. Cl.
USPC ............ 709/218; 709/203; 709/219; 709/224

(58) Field of Classification Search
USPC .................. 709/218, 203, 219, 224
See application file for complete search history.

(56) References Cited

U.S. PATENT DOCUMENTS

| 7,069,297 | B2 | 6/2006 | Kimura et al. |
| 7,330,871 | B2 * | 2/2008 | Barber .......................... 709/201 |
| 7,475,416 | B2 * | 1/2009 | Barrett ............................ 725/53 |
| 7,565,423 | B1 | 7/2009 | Fredricksen |
| 7,665,147 | B2 | 2/2010 | Sullivan |
| 7,984,500 | B1 * | 7/2011 | Khanna et al. ................... 726/22 |
| 8,307,099 | B1 * | 11/2012 | Khanna et al. ................ 709/229 |
| 2003/0140140 | A1 | 7/2003 | Lahtinen |
| 2006/0156389 | A1 | 7/2006 | Brown et al. |
| 2007/0067304 | A1 | 3/2007 | Ives |
| 2007/0245137 | A1 | 10/2007 | Bhagat et al. |

* cited by examiner

*Primary Examiner* — David X Yi
(74) *Attorney, Agent, or Firm* — Finnegan, Henderson, Farabow, Garrett & Dunner, LLP

(57) ABSTRACT

Processes are disclosed for fingerprinting and identifying client applications based on the analysis of client requests. In an HTTP-based embodiment, a fingerprint is constructed based on the presence and order of HTTP headers included in a request from a client application or device. This fingerprint may then be compared to known fingerprints associated with particular client applications to identify the particular client application and/or to assess whether the client application is malicious. The results of this analysis may, for example, be used to determine how to respond to the current request and/or subsequent requests.

9 Claims, 2 Drawing Sheets

CLIENT APPLICATION FINGERPRINTING BASED ON ANALYSIS OF CLIENT REQUESTS

CROSS-REFERENCE TO RELATED APPLICATIONS

This application is a divisional of U.S. application Ser. No. 12/176,603, filed Jul. 21, 2008 (now U.S. Pat. No. 8,244,799), and titled "CLIENT APPLICATION FINGERPRINT BASED ON ANALYSIS OF CLIENT REQUESTS." The entirety of the '603 application is incorporated herein by reference.

BACKGROUND

1. Field of the Disclosure

This disclosure relates to the servicing of client requests and, more particularly, to distinguishing and identifying user-client applications associated with requests.

2. Description of the Related Art

Users of networks, and requestors of web data in particular, have a significant number of client programs available for their use, such as Opera, Mozilla Firefox, Internet Explorer, and other custom-built or proprietary client programs. Because not all such client programs process received data in the same way, identical content served to, e.g., Opera may appear or behave quite differently than that served to and displayed to Internet Explorer.

Some client programs may identify their program make, version, and/or capabilities (i.e., they identify themselves, not which particular user they represent) as part of a request. Many such clients, however, provide users with the ability to "spoof", or make up, the client identifier. If such an identifier is successfully spoofed, a web server may end up serving content designed for one particular client program to a second, different client program. In particular, malicious programs or user client applications may fail to or falsely identify themselves. Malicious applications that are not identified as such may attempt to attack or undermine network resources through, for example, denial-of-service attacks, workflow evasion, automated 'bot' registration, and other means.

SUMMARY

Processes are disclosed for fingerprinting and identifying client applications based on an analysis of client requests. In an HTTP-based embodiment, a fingerprint is constructed based on the order and identity of HTTP headers included in a request from a client application and device. This fingerprint may then be compared to known fingerprints associated with particular client applications to identify the particular client application and/or to assess whether the client application is malicious. The results of this analysis may, for example, be used to determine how to respond to the current request and/or subsequent requests.

BRIEF DESCRIPTION OF THE DRAWINGS

Some embodiments of the invention are illustrated in the following drawings.

DETAILED DESCRIPTION OF SPECIFIC EMBODIMENTS

Figure 1:
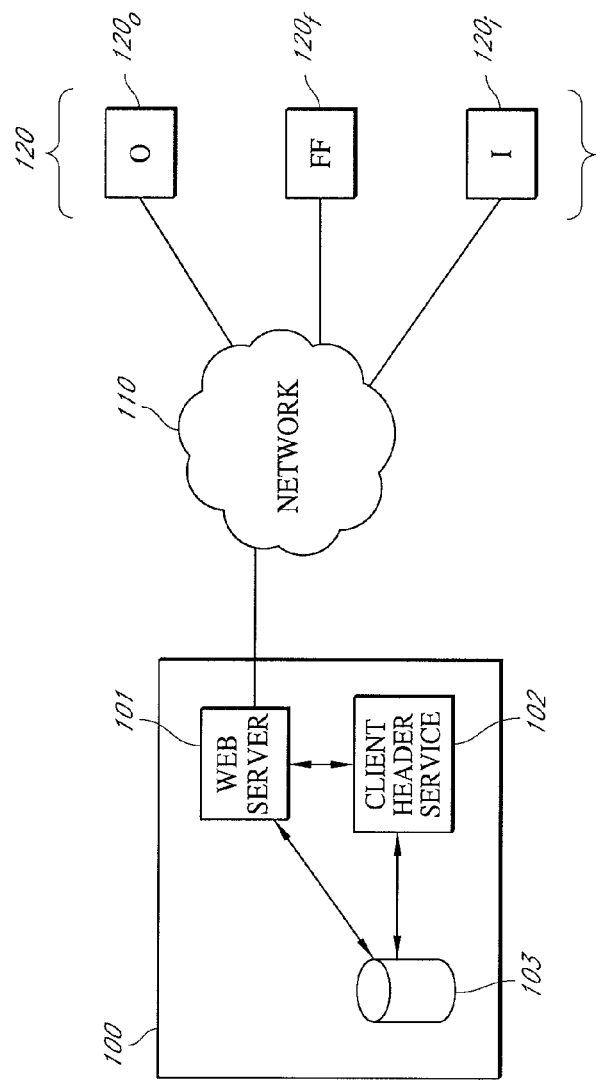
FIG. 1 is a schematic view of a system for fingerprinting and classifying user-client applications.

Some embodiments of the systems and methods disclosed herein may construct a fingerprint of a user-client application based upon the order and identity of Hypertext Transfer Protocol (HTTP) headers typically provided in requests made by that user-client application. Some embodiment may subsequently compare this fingerprint to a database of mappings from fingerprints to known applications in order to identify the user-client application. The identity of the user-client application itself may be used to perform additional processing, which may include, for example, transmission to a statistics-gathering system for site-optimization purposes and/or serving different content to different user-client applications. Some embodiments may compare the identity of the user-client application, as inferred from the fingerprint, to any identifying information provided by the user-client application (such as a User-Agent header).

1. Overview

Protocols are standards by which entities on a network, such as servers and clients, may communicate with each other. Example protocols are HTTP, HTTPS, 802.11g, SMTP, TCP. Protocols may be stacked upon each other, where a particular protocol is implemented with functionality from another protocol. So, for example, a request under the HTTP protocol may be broken down into TCP components, which themselves may subsequently be broken down into IP components, which may be further reduced into lower-level components. A more complete discussion of particular protocols and stacks may be found at Request for Comment 675, available at http://www.ietf.org/rfc/rfc0675.txt, and Request for Comment 1180, available at http://tools.ietf.org/html/rfc1180, both of which are hereby incorporated by reference in their entirety herein.

A protocol establishes the rules by which entities must (or should) communicate with each other. Some protocols, whether by design or accident, provide simple or relatively well-defined communication sequences. In these protocols, there may only be a small number of ways for a client to properly request or communicate particular information.

Other protocols, however, may be either so complex or so loosely defined that there may be a large number of ways in which entities may properly communicate while still staying within the protocol. In many respects, HTTP is an example of one such "loose" or "non-strict" protocol. More complete information about HTTP may be found at Request For Comment 2616, available at http://www.w3.org/Protocols/rfc2616/rfc2616.html, hereby incorporated by reference in its entirety.

For example, the HTTP protocol provides for a large number of "headers." Headers are name-value pairs (NVPs) which may be used, among other purposes, to allow a client to transmit additional data to a server as part of a request. Sample headers which may be included a given request include a Referer header (which may indicate the web resource from which the requested URI was obtained) and an Accept header (which may indicate which types of responses the requesting client is willing to accept from the server). The HTTP protocol does not specify the order in which headers should appear in a request. Therefore, using the examples above, there are at least two possible equivalent constructions for the same client request: One construction in which the Referer header appears lexicographically prior to the Accept header, and one in which the Accept header appears before the Referer. Real HTTP requests, of course, may contain far more headers than merely Accept or Referer. Those of skill in the art will recognize that, if a given request is to contain n headers, then there are n! possible lexicographic arrangements (permutations) of those n headers (each of which is a well-formed, valid request if any is).

The flexibility in the HTTP protocol described above may be used to differentiate user-client applications as follows. User-client applications, such as web browsers, are typically very complex pieces of software. As such, different user-client applications will be coded in different ways, and different codings may cause headers to be constructed differently or in different orders. In some browsers (say, for the sake of discussion, the Opera web browser), the program control logic may place the Referer header before the Accept header in a request. In others (say, Firefox), the programming logic may place the Accept header before the Referer. The order of headers may be consistent across a class of requests issued by given browser, and may be consistently distinct from the order of headers included by another browser in the same class of requests. As such, the order of the headers provides at least a partial fingerprint of the identity of the requesting user-application: A server receiving a request in which the Accept precedes the Referer may tentatively identify the user-application as Firefox—and disqualify Opera. As a given request may contain ten or twenty headers (and thus 10! to 20! possible permutations of those headers), a great number of distinct user-client applications may be classified—perhaps uniquely—by the arrangement of their headers.

Those of skill in the art also recognize that many HTTP headers are optional, in the sense that web servers will still return expected results if the header is left off. So, for example, the Referer header is most often optional—indeed, some user-client applications provide users with the ability to refuse to transmit a Referer header (for privacy purposes). As discussed above, different programs are programmed differently: Some may transmit a given optional header, while others may not. A server receiving a request may perform some fingerprinting (and classification) of the user-client application based on whether or not the user-client application sends optional headers. Those of skill in the art will recognize that fingerprinting and identifying of a given user-client application may depend as much upon what the user-client application does not send (as part of its request) as on what it does send.

Additionally, the apparent rigidity or looseness of a protocol is a function of the strictness of the communicating entities. Some entities may demand perfect or near-perfect adherence to the protocol. HTTP, however, has evolved in such a way that clients may send (and servers may accept) requests which are technically mal-formed, invalid HTTP requests. This may be due to a programming error in the user-client application, lack of familiarity with the HTTP standard on the part of programmers, or intentional malformation of headers in an attempt to add or modify functionality in the protocol.

As such, clients may send incorrect headers, headers with typos, or proprietary headers which are not part of the HTTP standard and not likely to (immediately) be copied by designers of other user-client applications. Therefore, fingerprinting may be performed based on any incorrect or proprietary header information received by the server. Indeed, in the case of proprietary features, it may be possible that a user-client application could be uniquely identified based solely on the use of a particular, uncommon proprietary header.

Additional elements of the HTTP standard and requests may be used to identify the particular user-client application making the request. In general, any element of a request that varies across browsers may be used for identification purposes. For example, cookies may be used. Cookies are commonly included as part of an HTTP request, and include name-value pairs. Multiple cookies may be included in a single request. As such, and as described above, different browsers may include cookies in a request in a distinguishable order. Moreover, different browsers may order the name-value pairs of a particular cookie in a distinguishable order. So, for example, assume a given request is to include three cookies, each containing a name-value pair, such as foo=1, baz=2, and bar=3. A first user-client application may include the name-value pairs in lexicographic order, viz. <bar, baz, foo>. A second browser may include the name-value pairs in creation or expiration order, e.g., <baz, foo, bar>. A third browser may include the pairs in an arbitrary (but deterministic) manner (perhaps as an artifact of the underlying data structures used to store the cookies in memory); this browser may order the name-value pairs as <baz, bar, foo>.

A server may typically expect certain name-value pairs to be present in a given request. (E.g., the server may expect cookie name-value pairs corresponding to login name and login time for requests to a members-only page.) The server could perform classification of user-client application requests based on the order of these expected name-value pairs. Moreover, as discussed above, a user-client application may neglect to send a name-value pair, especially if that name-value pair is optional (e.g., if the particular name-value pair is typically not required for the server to send an acceptable response). Classification may then take place based on name-value pairs that a user-client application does not send along in a request.

The foregoing principles are also applicable to protocols other than HTTP, and the present invention is not limited to the HTTP protocol. In general, any protocol may be used to identify and classify user-client applications to the extent that such user-client applications provide or create distinguishable data as part of requests. Such distinguishable data may include the headers, content, and/or metadata of requests and may be based on detection of alternate, well-formed phrasings and/or deviations from the protocol.

The HTTP protocol provides a mechanism for a user-client application to identify itself, viz., the User-Agent (UA) header. However, it is possible for applications to neglect to send the UA header, to send an improperly-formatted UA header, or to send an intentionally incorrect UA header. Because individual browser applications provide varying levels of functionality, some web servers will serve different web code to different applications, even when the applications make content- or protocol-equivalent requests. For example, a web server may serve one version of its homepage (optimized for Firefox) to a user-client application identifying itself as Firefox, while serving another version of its homepage (optimized for Opera) to a user-client application identifying itself as Opera. If a web server relies upon the UA header, and that header is set incorrectly by the user-client application, the web server may send an inappropriate or invalid response to the application. By relying upon more than the UA header, some embodiments of the present disclosure may detect the true user-client application, even when the UA header is missing or incorrect.

Moreover, not all requests originate from legitimate, well-intentioned users and user-client applications. Many users and user-client applications are, in fact, not well-intentioned and a content provider may wish to provide different content (or none at all) to such applications. The principles disclosed herein may be used to identify or help identify such malicious user-client applications.

Additionally, some user-client applications may have distinct purposes (such as search engine crawling), and a content provider may wish to provide content or functionality specifically matched to such special-purpose applications (and distinct from that provided to typical browsers). Fingerprinting of headers may allow these special-purpose applications to be detected and, thereby, may allow differential content to be served to them.

The foregoing discussion also applies to distinguishing different versions of the same user-client application. The ability to uniquely (partially) identify and classify user-client application versions may be useful for, e.g., deciding what content to serve to the user-client application. For example, if a certain version of a certain browser is known to suffer from a particular bug, identification of the version of the browser may allow content including a work-around for that bug to be transmitted to the browser.

2. Illustrative System Components

FIG. 1 illustrates a schematic block diagram of a demonstrative architecture of a system 100 in accordance with some embodiments of the disclosure. The system 100 is accessible via the Internet 110 to at least one user-client application represented on a computing device (collectively illustrated at 120). The Internet 110 may include personal networks, local area networks, wireless networks, and closed networks. Computing devices may include, without limitation, personal computers, personal digital assistants, mobile phones, or television set-top boxes. User-client applications may include, without limitation, web browsers, spiders, crawlers, scrapers, and so forth. Three illustrative examples have been provided in FIG. 1: 120o represents the Opera Mini browser running on a mobile phone; 120f represents the Firefox browser running on a desktop PC; and 120i represents the Internet Explorer browser running on a TV-top network appliance.

The system 100 may comprise a web server 101, a client header service ("CHS") 102, and a data repository 103. The web server 101 and CHS 102 may each be implemented in an appropriate combination of computer hardware and software (executable instructions). For example, each may be implemented via code modules that run on one or more physical servers. The web server 101 typically responds to requests from user-client applications 120; these requests and responses may be transmitted over a network 110, such as the Internet, as shown or through other means. As part of fulfilling requests, or in addition thereto, the web server 101 may transmit at least a part of a request (or a representation thereof) to the CHS 102. The web server may also be in communication with the data repository 103. The web server may store data in the repository 103 and may retrieve that same data (or different data) from the repository 103.

The CHS 102 typically receives data regarding requests from the web server 101. The CHS may analyze header information contained in a request, and may return information regarding the analysis (such as results) to the web server 101. Alternatively or additionally, the CHS 102 may store and/or retrieve information in the data repository 103. Either directly, or via the data repository 103, web server 101, or other mechanism (not shown), the CHS may make information available to additional, unrepresented components of the system 100, such as a metrics/statistics component, a logging component, a display component, and/or so forth. Similarly, information may be made available to other systems or components outside the system 100, including (without limitation) affiliates, subsidiaries, third parties, regulators, and so forth. This information may be made available through Simple Object Access Protocol ("SOAP") or other mechanisms or APIs known in the art.

3. Illustrative System Operation

With reference to FIG. 1, one illustrative use of one embodiment of the system 100 will now be described. Broadly speaking, this example illustrates how the system 100 may be used, among other purposes, to distinguish among user-client applications making equivalent requests and to serve different content to the different applications.

Assume a first user running a first user-client application, here illustrated in FIG. 1 as a Firefox browser 120f, and a second user running a second user-client application, here illustrated as an Internet Explorer browser 120i, each make a request to a content provider implementing the system 100. For the sake of this example, assume that each request is an HTTP GET request for the Uniform Resource Indicator (URI) http://serviceprovider.com/index.html. The requests may be routed through the Internet 110, another communication network, or a combination of both. A simplified representative sample of the request from user-client application 120f is illustrated at Table I; an analogous request from user-client application 120i is illustrated at Table II. (For clarity, the header values have been omitted.)

TABLE I

A representative client request from FireFox

GET /index.html HTTP/1.1
Host:
User-Agent:
Accept:
Accept-Language:
Accept-Encoding:
Accept-Charset:
Keep-Alive:
Connection:
Referer:
Cookie:

TABLE II

A representative client request from Internet Explorer

GET /index.html HTTP/1.1
Accept:
Referer:
Accept-Language:
Accept-Encoding:
User-Agent:
Host:
Connection:
Cookie:

Each sample request shown in the tables contains several headers. Moreover, while both requests are for the same data (namely, the content at the URI http://serviceprovider.com/index.html), each request contains different headers, and different headers may have different values (not depicted). Here, the sample request from the first user-client application 120f contains 10 headers, while the request from the second user-client application 120i contains 8 headers.

The web server 101 may receive the request from the user-client application 120f and may thereafter transmit all or part of the request to the CHS 102 for analysis. The CHS 102 may examine each request to produce a request score (CHSS-core), as shown in Tables III-V. The scores may be generated such that the respective scores for two requests having the same headers (but not necessarily the same header contents) will be the same or similar. Conversely, the scores for two requests having different headers will be different. Such a score may be generated by a hash mechanism. In particular, with reference to Table III, all or some subset of the headers defined in the HTTP protocol (column 1), and possibly any headers not defined in the protocol but observed in client requests, may each be associated with a number comprising a unique power of two (columns 2 and 3). For example, the UA header may be associated with 512 (=2^9), the Referer header may be associated with 256 (=2^1), and the Accept header may be associated with 4 (=2^2). A composite score for a request may then be produced, where the score is equal to the sum of the numeric values associated with all the headers present in the request. Thus, a request containing only the Referer and Accept headers may be accorded a CHSScore of 260 (=256+4). It will be recognized by those of skill in the art that the foregoing algorithm produces a bidirectional mapping from the powerset of a (possibly improper) subset of all headers to a subset of nonnegative integers.

TABLE III

Example Header Score and Value Pairings

| Header Name | Score (2^x) | Score | Character |
|---|---|---|---|
| <unknown> | 0 | 1 | — |
| Host | 1 | 2 | a |
| Accept | 2 | 4 | b |
| Accept-encoding | 3 | 8 | c |
| Accept-language | 4 | 16 | d |
| Accept-charset | 5 | 32 | e |
| Te | 6 | 64 | f |
| connection | 7 | 128 | g |
| Referrer | 8 | 256 | h |
| user-agent | 9 | 512 | i |
| Cookie | 10 | 1024 | j |
| content-encoding | 11 | 2048 | k |
| keep-alive | 12 | 4096 | l |
| ua-cpu | 13 | 8192 | m |
| pragma | 14 | 16384 | n |
| content-type | 15 | 32768 | o |
| content-length | 16 | 65536 | p |
| if-modified-since | 17 | 131072 | q |
| Trailer | 18 | 262144 | r |
| transfer-encoding | 19 | 524288 | s |
| ... | ... | ... | ... |

Alternatively or additionally, the CHS may examine the request to produce a request header order value (CHSOrder). Such a CHSOrder may be generated by assigning a unique code character (e.g., without limitation, an ASCII character) (Table III, column 4) to each header defined in the HTTP protocol (column 1) or known in the wild. So, for example, the UA header may be associated with the character T, the Referer header with 'h', and the Accept header with 'b'. An order for a given request may then comprise the string constructed according to the following equation:

$$s_1 s_2 s_3 \ldots s_n | s_i = \text{code character associated with the } i^{th} \text{ header of request} \quad [EQ1]$$

EQ 1 describes a string where the $i^{th}$ character of the string (counting from the left) is equal to the code character of the $i^{th}$ header of the request.

Thus, for example, a request containing exactly two headers, where the lexicographically first header is an Accept and the second header is a Referer (hereafter represented as the ordered set <Accept, Referer>), may be assigned the string "bh" while a request containing the headers <Referer, Accept, UA> may be assigned the string "hbi". Those of skill in the art will recognize that the algorithm thus described produces a bidirectional mapping from the set of all permutations of all elements of the powerset of a (possibly improper) subset of all headers to a subset of strings.

In the course of analyzing requests, the CHS 102 may encounter undefined, uncoded, or otherwise unknown headers. As described above, such headers may provide insight into the identity of the requesting user-client application. The CHS 102 may handle such unknown headers by inserting a special character (perhaps "_", as shown at column 1, row 1 in Table III) in the $i^{th}$ place of the CHS Order string if the $i^{th}$ header of the request is unknown. The order string may then have the name of the unknown header appended. So, for example, a request with header set <Accept, Foo, Referer>, where Foo is an unknown header, may have an order code of "b_h, Foo". Multiple unknown headers may be handled by inserting a special character in the place of each unknown header, and appending the multiple unknown headers in lexicographic order. An example order string would be "b_h, Foo, Bar". For the CHSScore, the CHS 102 may reserve a power of 2 for an unknown header, such as that illustrated at column 2, row 1. The CHS 102 may reserve multiple distinct powers of two corresponding to multiple unknown headers.

Table IV illustrates an example process of assigning CHSOrders and CHSScores to the sample request of Table I. At column 1, the headers present in the request are listed in an order, such as the order in which they were received. At columns 2 and 3, the numeric values corresponding to each header name (as drawn from Table III, columns 2 and 3) associated with each header in the request. These numerical values are then summed (column 3, last row) to produce a CHSScore. Similarly, at column 4, the characters corresponding to each header name (drawn from Table III, column 4) are associated with each header in the request. The characters are then concatenated in-order (column 4, last row) to produce a CHSOrder string.

TABLE IV

FireFox Request

| Header (In Order) | Score (2^x) | Score | Character |
|---|---|---|---|
| Host | 1 | 2 | a |
| User-Agent | 9 | 512 | i |
| Accept | 2 | 4 | b |
| Accept-Language | 4 | 16 | d |
| Accept-Encoding | 3 | 8 | c |
| Accept-Charset | 5 | 32 | e |
| Keep-Alive | 12 | 4096 | l |
| Connection | 7 | 128 | g |
| Referer | 8 | 256 | h |
| Cookie | 10 | 1024 | j |
| CHS Values: | | 6078 | aibdcelghj |

Table V illustrates the same process, as applied to the Internet Explorer request illustrated in Table II. As noted, the algorithms produce different fingerprints, viz. CHSOrders and CHSScores, for each request.

TABLE V

Internet Explorer Request

| Header (In Order) | Score (2^x) | Score | Character |
|---|---|---|---|
| Accept | 2 | 4 | b |
| Referer | 8 | 256 | h |
| Accept-Language | 4 | 16 | d |

TABLE V-continued

Internet Explorer Request

| Header (In Order) | Score (2^x) | Score | Character |
|---|---|---|---|
| Accept-Encoding | 3 | 8 | c |
| User-Agent | 9 | 512 | i |
| Host | 1 | 2 | a |
| Connection | 7 | 128 | g |
| Cookie | 10 | 1024 | j |
| CHS Values: | | 1950 | bhdciagj |

It will be also be appreciated that associating headers with powers of two allows CHSScores to be represented and manipulated as bitfields. Thus, CHSScore of the Internet Explorer request of Table V may be represented as b11110011110. Use of bitfields allows comparison of CHSScores using bitmasks and bitwise logical operations as is well-known in the art.

Of course, those of skill in the art will recognize that the principles disclosed herein extend far beyond representing a set of headers with the sum of a set of powers of two or a sequence of characters. Various other algorithms may be used, including, for example and without limitation, the use of bases other than two, prime factors, strings, words and phrases, sets, and bi-directional functions. Moreover, neither the CHSScore or CHSOrder are required or exclusive; either one (or an analogue of either one) may be used solely or in combination with other data and information. For example, the CHS 102 may associate additional information with a given request, including, but not limited to, any, all, or some of the following:

Tdiff: An indication of the time delta between establishment of a client-server TCP session and complete reception of the client request (by the server).

Port: The remote port used by the client to establish the session.

CCount: The number of name-value pairs in any cookies present in the request.

Method: The request method, e.g. a GET or a POST.

These additional data may be appended or prepended to the score or order. The CHS may store the data associated with a request, including order and score, in the repository 103 and/or may return this data to the web server 101 for use in determining how to respond to a given request.

The repository 103 may further contain a mapping of known score or order values to likely browsers. This fingerprint data store may be utilized by the CHS to identify the likely user-client application associated with a given order or score. Thus, for example, referring to Table IV, the fingerprint data store may contain a mapping from "6078" and/or "aibdcelghj" to FireFox. The fingerprint store may indicate particular mappings with certainty, or with relative uncertainty, and may include version information. Thus a particular mapping may be represented schematically as "zx=>Opera" or "zx=>Opera 50% {v9.50 30%; v9.26 20%}; Firefox v2 50%". One of skill in the art will recognize that the underlying mappings may be considerably more complex than these schematic illustrations and, moreover, that data structures and algorithms may be used to dynamically generate classifications and certainties.

It is not necessary that mappings include all headers of a request. For example, it may be possible to uniquely identify the Firefox browsers by the leading CHSOrder characters of, for example, "aibd". Different requests by Firefox browsers may include some, all, none, or differing subsequent headers; the CHS 102 may analyze each such request individually, or identify the user-client application as Firefox whenever a request with the prefix "aibd" is received.

The mappings in the fingerprint store may be updated manually by operators of the system 100. The CHS may also be placed in a "training mode" whereby new or modified mappings are added to the fingerprint store. For example, in training mode, particular order and/or score fingerprints could be automatically associated with the browser identified in a client request's UA header, if present. Alternatively, the CT-IS may track session information, e.g. through session identifiers, cookies, or a similar mechanism, and may use the session information to infer the browser identity. So, for example, if a request with a particular session ID has a score/order which maps to particular user-client application, then the CHS may infer that the scores/orders of other requests with that same session ID should also map to that particular user-client application.

Tracking sessions or cookies may also be used to adjust the weights or likelihood of particular mappings and identifications. Thus, the CHS 102 may have tentatively identified the user-client making a set of requests as Opera. Subsequent requests, if containing scores consistent with Opera, may increase the CHS's 102 certainty. Alternatively, if subsequent requests map to scores/orders which are mapped to other browsers (or to Opera with only low probability), the CHS 102 may decrease the certainty of the tentative identification.

An identification, tentative or otherwise, may be returned to the web server 101. The web server may use this identification, coupled with information in the data store 103, to serve content in response to the request. So, for example, the web server may return a version of the homepage serviceprovider.com/index.html optimized for Firefox to the user-client application 120f identified as Firefox. Similarly, the web server may send a response optimized for Opera 9.5 to the user-client application 120o identified as Opera 9.5.

Additionally, the CHS 102 may cause statistical information regarding browser identifications to be recorded in the data store 103 or transmitted to other components. So, for example, if the CHS 102 identifies a particular request as originating from Firefox, the CHS may create a record or increment a Firefox-request counter in the data store 103. Such records and counters may be used to produce aggregate statistics, such as the percentage of requests made by Opera user-client applications, and so forth.

4. Example Use Cases

A few illustrative use cases for embodiments according to the disclosure will now be described.

Automated Client Fingerprinting & Content Delivery

Web browsers are one type of user-client application. There are several browser applications available to the public, such as Opera, FireFox, Internet Explorer, Lynx, and Safari. Most of these browsers (with the possible exception of Lynx) are updated regularly. These browser applications are in intense competition with each other. As such, the entities providing the applications (e.g., Microsoft, Mozilla, Apple, and Opera Software) have an incentive to accurately identify browser applications and to provide differential content to users. For example, Opera Software may choose to divide visitors to its home page into three groups: (1) Those using browsers from other entities may be presented with pages highlighting the security flaws of the user's current browser and suggesting that the user switch to Opera; (2) those using older version of Opera may be presented with pages suggesting that the user upgrade; and (3) those using the current version of Opera may be presented with plugins and a thank-you note.

Figure 2:
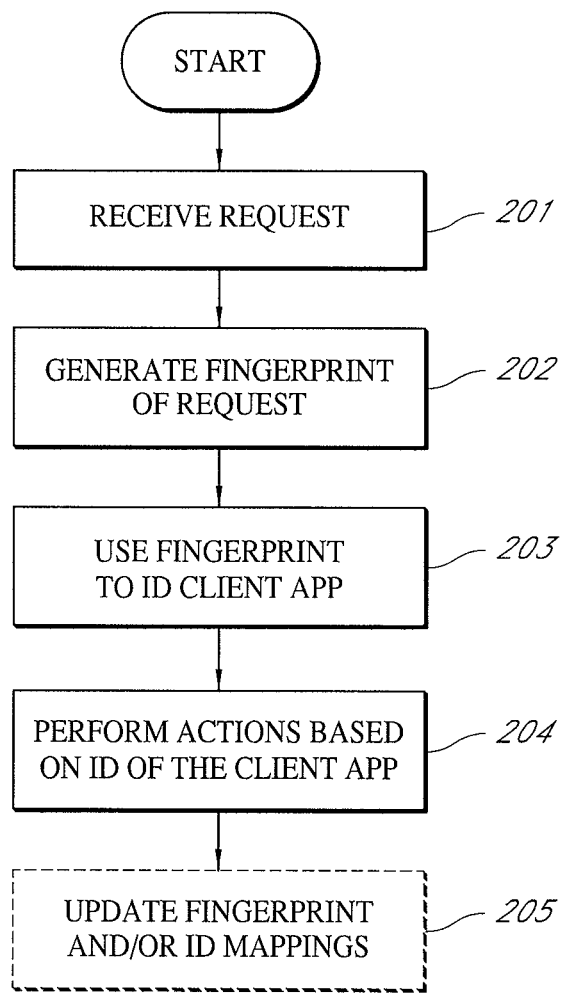
FIG. 2 illustrates a method of identifying a user-client application via fingerprinting of request headers.

FIG. 2 illustrates some of the elements of a method for providing functionality to accomplish this objective. This method may, for example, be implemented collectively by a web server 101 and client header service 102 as depicted in FIG. 1. At block 201, the web server system may receive a request from a user-client application. At block 202, the system may generate a fingerprint corresponding to the request, where the fingerprint comprises the CHSOrder, CHSScore, and/or some other data as discussed above. At block 203, the system uses the fingerprint to identify the request client application, such as through the mapping tables disclosed above. At block 204, the server may use the identity of the client application to determine which content to send to the application. If the application's fingerprint matches the latest version of Opera, the user may get the congratulatory note. If the fingerprint matches a previous version of Opera, the user may get an upgrade notice. If the fingerprint matches a particular version of Internet Explorer, the user may be referred to known security flaws of that version and be presented with text suggesting "Why not switch today?"

At block 205, the server may optionally update its fingerprint algorithms (including the number or types of headers analyzed) and/or the fingerprint→application mappings as discussed above.

Client Fingerprint Service

The CHS 102 need not obtain information only from a web server 101 of the system 100. In some embodiments, the CHS 102 may be provided as a web service to $3^{rd}$ parties, affiliates, or other systems. In such a case, information regarding requests, including the requests themselves, or a part thereof, may be transmitted from a $3^{rd}$ party to a system 100 implementing a CHS 102 via typical web services mechanisms or other communication method. The CHS may perform analysis of the type described above, and may store information in the data store 103, and/or return client identification information in real time to the $3^{rd}$ party system. Information may be stored on a per-$3^{rd}$-party or per-web-site basis. In some embodiments, knowledge gleaned from requests received via one $3^{rd}$ party or site may be used to improve or modify fingerprinting of requests received via another $3^{rd}$ party or site. In other embodiments, the system 100 may use independent mapping databases for each $3^{rd}$ party.

Some embodiments may include a revenue generation or accounting module, wherein $3^{rd}$ parties are charged a flat fee (perhaps monthly, yearly, or daily) for usage of the system 100. Alternatively or additionally, $3^{rd}$ parties may be charged a fee per request fingerprinted.

Distinguishing Clients Based on Header Values

Some of the CHSOrder and CHSScore algorithms discussed above assign a character or a number to each header (or some headers) in a request. The algorithms may be extended to recognize deviations from the protocol and use such deviations to aid in fingerprinting user-client applications. Similarly, particular (valid) header values may be associated with particular clients or groups of clients and therefore be used to aid in fingerprinting.

For example, typical UA headers look like "User-Agent: <Agent>" where <Agent> is an identifier of the user-client application, such as "Mozilla/4.0 . . . " or "Opera/9.50 . . . ." A particular user-client application may have a bug that causes it to create UA headers of the form "User-Agent: user-agent=<Agent>". The CHS 102 may assign a special character or number (distinct from the character or number associated with 'typical' UA headers) to any header that has the extra "user-agent=" verbiage. Thus, two requests from two different user-client applications, where the only difference between the requests is that one has a 'typical' UA header and one has a buggy "user-agent=" header, may receive different CHSOrders or CHSScores. As discussed above, the different scores may be used to distinguish the user-client applications making the requests.

Malicious and Special-Purpose Client Detection

As discussed above, the ecosystem of user-client applications includes legitimate, well-known browser applications such as FireFox, as well as purposefully malicious user-client applications (such as registration bots) and legitimate-but-special-purpose applications (such as search spiders). A server may wish to perform certain actions, such as enhanced logging, alerting, or serving different content, to user-client applications identified as malicious or special-purpose.

As many malicious and special-purpose user-client applications may be custom-built, their underlying request header construction engines may produce a different set of headers, and a different permutation of those headers, than other user-client applications. Moreover, while typical commercial browsers, such as Opera, have a large team of dedicated programmers and quality-control technicians, the programmers of one-off, special-purpose browsers may have other projects. Thus, such one-off applications may implement (and transmit) more or fewer headers on average, or may utilize other, less frequently observed headers, than other browsers.

Additionally, many malicious and special-purpose browsers are built on top of or use standard programming platforms, such as Perl's HTTP::Request module. Such platforms may construct headers in a fashion that may be distinct from other browsers. As an example, auto-registration robots are user-client applications which attempt to automatically register new accounts with service providers, typically in violation of the terms-of-use provisions of the service provider. New accounts may be used to, for example, send spam email messages. Some auto-registration robots are built using Perl's HTTP::Request module and thus produce a particular ordering of request headers, which, as discussed above, produces a particular CHSOrder and CHSScore.

A system 100 may attempt to mitigate auto-registration robots as follows: If an HTTP request corresponding to an attempt to create a new account is received, the web server 101 may poll the CHS 102 to determine, using the techniques described above, whether the user-client application is likely to be (1) an accepted browser (such as Opera) typically corresponding to a real, legitimate user or (2) a suspicious user-client application, such as one that appears to be using Perl's HTTP::Request module. The web server 101 may allow requests of type (1) to successfully create new accounts. The web server 101 may, however, implement different functionality for requests of type (2). This functionality may include extra security precautions (e.g., an extra-difficult or additional CAPTCHA), dropping the request, sandboxing the request (e.g., making the request appear to successfully create an account, but neutering the account such that it does not have full functionality), or performing additional forensic activities on the request (such as assigning a honeypot account to the request).

In some embodiments, the client fingerprinting server disclosed above may be used in combination with detection of malicious client applications. So, for example, fingerprints of known or suspected malicious applications may be transmitted to third party installations. Similarly, fingerprints of suspected malicious applications may be transmitted from third party installations to the system for analysis by the CHS.

Cooperative Fingerprinting and Behavioral/Capabilities Classification

The CHS 102 may work with other components, manually or automatically, to improve fingerprinting. For example, a behavior-tracking component (not illustrated in FIG. 1) may analyze incoming requests for particular behaviors and may thereafter update the CHS 102 or the data store 103. So, for example, imagine that a behavior tracking component notices that requests from an unknown user-client application (with CHSScore=0x39fa) appear to be consistent with web site spidering or crawling robots. (E.g., the system 100 is receiving approximately 100 requests per minute, all from the same small set of IP addresses, in a netblock known to be owned by a search engine company.) The behavioral tracking component and/or the CHS 102 may create a mapping or association from the CHSScore 0x39fa to a "crawler/spider" indicator.

This indicator may be in addition to, or separate from, the identification of the user-client application. Behavioral tracking may be used to assign certain capabilities or other classifications to the user-client applications making requests with specific CHSOrders/Scores. So, for example, the data store 103 may associate CHSScore 0x39fa with multiple identities, certainties, roles, and classifications, such as [HTTP::Request 75%, FireFox 25%; SSL-enabled; uses-cookies; crawler/spider]. The associations need not necessarily be consistent with each other and may be used in conjunction with other components to vary the functionality or content delivered to the requesting user-client application.

If a new or relatively uncommon fingerprint (corresponding to a new or uncommon user-client application) is detected by the CHS 102, the CHS 102, the system 100, or an external system, may automatically (or with manual assistance) access data, including, for example, server log data of the system 100 or another system, to assess whether, for example, the client is associated with legitimate or malicious activity. The outcome of this analysis may be made available to the CHS 102 and/or the web server 101 to determine how to respond to the current request and/or subsequent requests.

Distinguishing Clients Based on Header Values Analysis

As discussed above, some cookie usage protocols, such as that contained in Request For Comment 2965, available at http://www.faqs.org/rfcs/rfc2965.html, hereby incorporated by reference in its entirety herein, allow multiple cookie name-value pairs (NVPs) to be placed in any order within a request. CookieOrders and CookieScores may be calculated in a manner similar to CHSOrders and CHSScores, namely by replicating the above algorithms with every instance of "header" replaced with "cookie name-value pair." Additional data as described above may also be calculated. CookieScores and CookieOrders may distinguish one user-client application from another if, for example, each user-client application uses a different ordering of NVPs within the request.

The algorithms described above may also be applied to other sequences of header values, including, for example, values associated with the Accept or Accept-Encoding headers.

5. Conclusion

The systems, methods, and techniques described here may be implemented in computer hardware, firmware, software, or in combinations of them. A system embodying these techniques may include appropriate input and output components, a computer processor, and a computer program product tangibly embodied in a machine-readable storage component or medium for execution by a programmable processor. A process embodying these techniques may be performed by a programmable processor executing a program of instructions to perform desired functions by operating on input data and generating appropriate output. The techniques may advantageously be implemented in one or more computer programs that are executable on a programmable system including at least one programmable processor coupled to receive data and instructions from, and to transmit data and instructions to, a data storage system, at least one input component, and at least one output component. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage components suitable for tangibly embodying computer program instructions and data include all forms of non-volatile memory, including by way of example semiconductor memory components, such as Erasable Programmable Read-Only Memory (EPROM), Electrically Erasable Programmable Read-Only Memory (EEPROM), and flash memory components; magnetic disks such as internal hard disks and removable disks; magneto-optical disks; and Compact Disc Read-Only Memory (CD-ROM disks). Any of the foregoing may be supplemented by, or incorporated in, specially-designed ASICs (application-specific integrated circuits).

Although this disclosure describes certain embodiments and applications, other embodiments and applications that are apparent to those of ordinary skill in the art, including embodiments and applications which do not provide all of the features and advantages set forth herein, are also within the scope of the disclosure. Moreover, all lists and descriptions of options and alternatives are to be construed as exemplary and not limiting; lists have been used to aid explanation and are not an attempt to name all possible alternatives. The scope of the present invention is intended to be defined only by reference to the claims.

What is claimed is:

1. A computer system for generating a fingerprint corresponding to a browser request comprising headers, the computer system comprising:
   a database storing a map correlating each of a plurality of header types to a combination of one of a plurality of characters and one of a plurality of values;
   a processor configured to:
      process the headers in the browser request to retrieve a character and a value from the map for each one of the headers in the browser request based on a header type of the header;
      concatenate the retrieved characters of all of the headers in the browser request in the same order as the headers in the browser request to produce an order string;
      sum the retrieved values of all of the headers in the browser request to produce a score of the browser request;
      generate the fingerprint comprising the order string and the score of the browser request;
      analyze the score to determine whether the score falls within at least one predefined numerical range associated with a particular type of client application; and when the score falls within the at least one predefined numerical range associated with the particular type of client application, identify the particular type of client application as a sender of the browser request.

2. The computer system of claim 1, wherein each value in the map for each distinct header type is a distinct power of a base.

3. The computer system of claim 1, wherein the score is represented as bitfields.

4. A method of generating a fingerprint corresponding to a browser request comprising headers, the method comprising:

provinding a map correlating each of a plurality of header types to a combination of one of a plurality of values and one of a plurality of characters;

retrieving, for each one of the headers in the browser request, a value and a character from the map based on a header type of the header; and summing the retrieved values of all of the headers in the browser request to produce a score of the browser request;

concatenating the retrieved characters of all of the headers in the browser request in the same order as the headers in the browser request to produce an order string of the browser request;

combining the score and the order string to generate the finger print;

analyzing the score to determine whether the score falls within at least one predefined numerical range associated with a particular type of client application; and when the score falls within the at least one predefined numerical range associated with the particular type of client application, identifying the particular type of client application as a sender of the browser request.

5. The method of claim 4, wherein the values are unique to each header type.

6. The method of claim 4, wherein requests differing only in the order of the headers will correspond to different order strings.

7. The method of claim 4, wherein a first request and a second request corresponding to a permutation of the headers of a reference request are assigned distinct order strings.

8. The method of claim 4, wherein a first request and a second request corresponding to a permutation of the headers of a reference request are assigned the same score.

9. The method of claim 4, wherein the content of a response to the browser request is based at least partly on an identity of the client application.

* * * * *